Feb. 15, 1944. G. CATALANI 2,341,595
REFRIGERATING APPARATUS
Filed Feb. 21, 1940 2 Sheets-Sheet 2

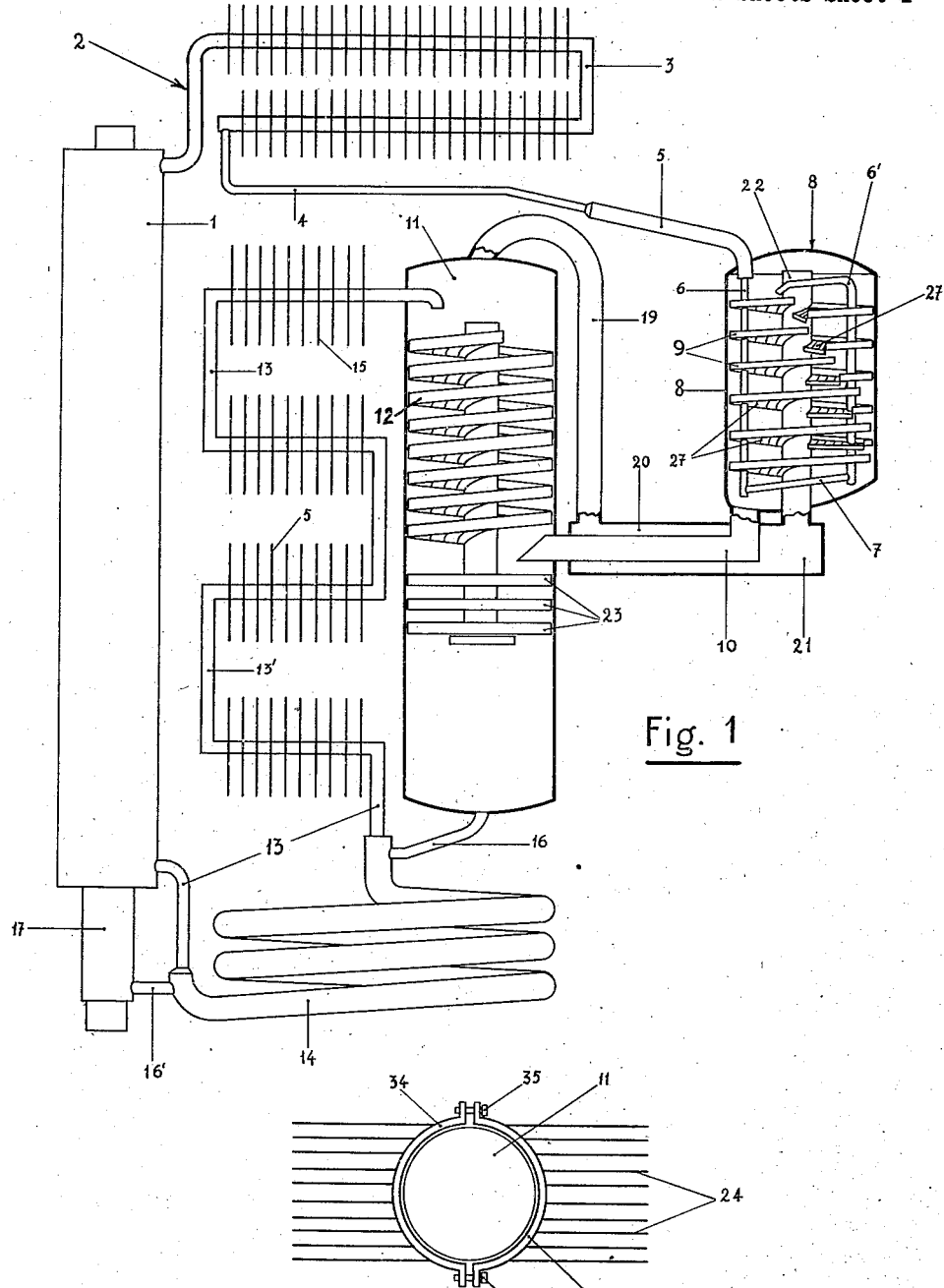

INVENTOR
GIUSTO CATALANI
BY
Young, Emery & Thompson
ATTYS.

Patented Feb. 15, 1944

2,341,595

UNITED STATES PATENT OFFICE 2,341,595

REFRIGERATING APPARATUS

Giusto Catalani, Genova-Bolzaneto, Italy; vested in the Alien Property Custodian Application February 21, 1940, Serial No. 320,181
In Italy February 22, 1939

2 Claims. (Cl. 62—119.5)

The present invention relates to a refrigerating apparatus and particularly to refrigerating apparatus of the absorption type.

The principle upon which the refrigerating absorption apparatus is founded, is well known: according to this principle, a liquid having dissolved in it gases capable of condensing, at a rather high temperature, and evaporating by absorption of a great amount of heat, is heated in a boiler. As a result of this heating, the gases are separated from the liquid. Said gases are cooled by a water or air cooled coil and are condensed. The liquid thus obtained, is delivered for evaporation into the evaporator and the cool vapors thus produced are conveyed from the evaporator to the absorption apparatus where they are brought into contact with the liquid coming from the boiler and in which liquid they are dissolved, to start once again their cycle of operation as mentioned above.

The main object of the present invention is to provide an improved refrigerating apparatus comprising a boiler, an evaporator and an absorber, such as to render the apparatus more simple and more efficient than those of the types already known.

Another object of the invention is to provide a refrigerating system comprising an evaporator and an absorption apparatus, each enclosed in a metallic container and placed side by side on the same level and in direct communication with each other, thereby favouring the absorption of the gases in the absorber and reducing the pressure in the evaporator, so as to allow a more rapid and complete expansion of the refrigerating liquid in the evaporator.

The invention will, however, be better understood from the following description which discloses by way of an example only, and with the aid of the accompanying drawings, a constructional form that the invention may assume.

In the drawings:

Fig. 1 is a diagrammatic view of the refrigerating system according to the invention;

Fig. 2 shows a plan view of the radiating system with which the absorption apparatus is provided;

Figure 3:
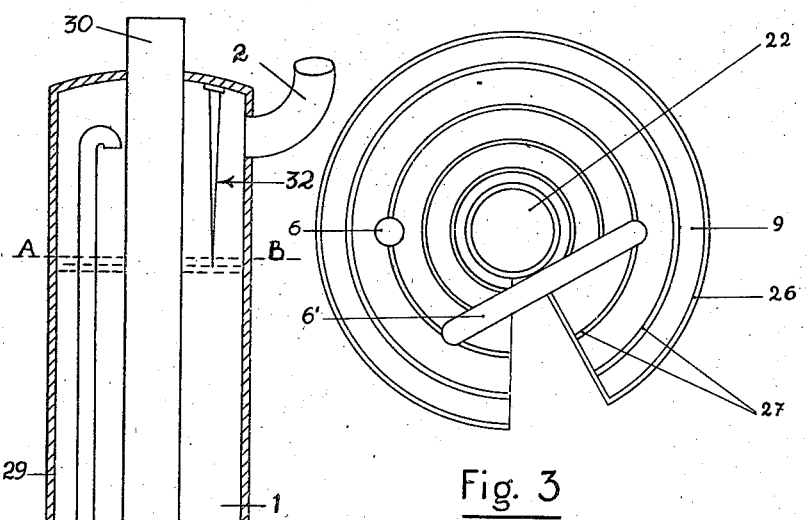
Figs. 3 and 4 show respectively a plan view and an elevation of one of the helicoidal members with which the absorber and evaporator are provided.

Referring to the drawings (Fig. 1), I represents the boiler, 2 the conduit through which the refrigerating gas is delivered to the cooling coil 3, in which it is condensed. The coil 3 may be either air cooled or water cooled.

The refrigerating liquid thus obtained, is delivered to the evaporator 8, through the tubes 4 and 5. Here, it is not brought to evaporate immediately, but, for the purpose of cooling it further, it is forced to pass through the conduits 6, 7 and 6' and therefore to drip onto the uppermost helicoidal member 9.

Figure 4:
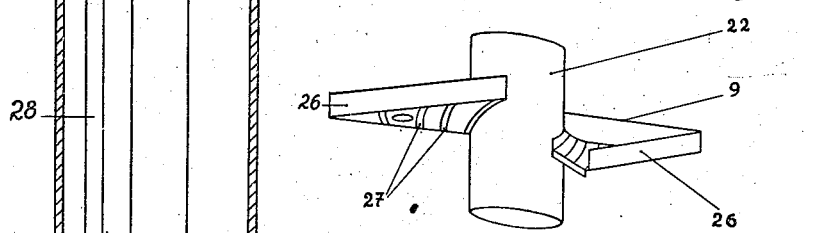
Figure 5:
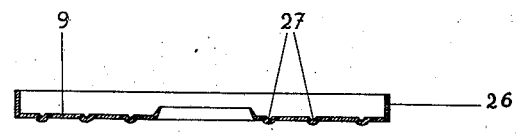
Fig. 5 shows a diametrical section of said member.

The evaporator 8 comprises an external metallic container which, as illustrated in the drawings, is cylindrical and in the inside of which a number of helicoidal members are arranged. The peripherial portions of said members are in tight contact with the walls of the container, while in their central zone said members are provided with a hole which will allow them to be fitted onto the central and hollow cylinder 22. These members 9 are disc-shaped, but they have a sector cut off, as shown in Figs. 3, 4 and 5. They are also provided with a peripherial rim 26 bent upwards and with the grooves 27 on their upper surfaces. The rim 26 has the purpose of ensuring a tight contact between the discs 9 and the container 8, while the grooves have the purpose of leading the refrigerating liquid in its downward trend into the interior of the evaporator.

These helicoidal members 9 are similar to the members 12 of the absorber 11, but these latter are complete and assembled on the central cylinder 22 so as to constitute a continuous helix device.

As these elements are in perfect contact by means of their peripherical rim with the outer cylindrical container 11, they form a helicoidal passage into the absorber 11, in which the liquid coming from the boiler and the gas from the evaporator, flow in the opposite direction, as will be further explained hereinafter.

The absorber 11 also contains, in its lower region, flat discs 23, which are provided with holes, the purpose of which will be further explained hereinafter.

The elements 9 in the evaporator 8 are not arranged alongside each other, as they would be in the case of the abosrber 11, but are maintained spaced apart a small distance from one another, so that the refrigerating liquid which flows on them will drip from one onto the other, in order to favour the evaporation of said liquid.

The conduit 7 is not connected to the lower ends or extremities of the tubes 6 and 6', but somewhat higher up, and this for the purpose of providing two lower blind portions of the tubes 6 and 6', into which all the dirt and impurities which the refrigerating liquid may carry along with it, may be collected.

The refrigerating liquid which, as already stated, drips from the outlet of the tube 6' onto the upper member 9, passes successively onto all the helicoidal members 9 and as it is flowing on its path, it evaporates and abstracts heat from the medium which must be cooled. The cold and heavy gas thus formed, collects in the lower region of the evaporator 8 and is delivered to the absorber 11 through the conduit 10. Here it finds the surfaces of the discs 23 wet with liquid and starts to dissolves again in same; it then runs the helicoidal path established by the members 12, while the same path is followed in the opposite direction by the liquid coming from the boiler. In such a way, a further absorption of the gas by the liquid is obtained, so as to obtain again the original solution, which is then sent back into the boiler. To return said solution into the boiler again, the solution is forced, after having passed the holes of the disc 23 which operate also as filters, to pass through the tube 16 and through the space between the two concentric coils 13 and 14 and then it is delivered to the boiler through the tubes 16', 17 and 28, and the above described cycle is repeated.

On the other hand, the liquid coming from the boiler and being deprived of substantially all the gas dissolved in it, circulates in the coil 13, which is the inner of the two coils mentioned above. The purpose of these two concentric coils is that of causing advantageous exchanges of heat between the two liquids with the maximum utilization of the heat supplied to the boiler. In fact, the liquid passing through the coil 13, is very hot, and in order to make possible the dissolution of the refrigerating gas in said liquid, it is necessary to lower the temperature of the liquid. Now, the solution containing the refrigerating gas and leaving the apparatus 11 is relatively cold, but it must be reheated, in order to develop the refrigerating gas, so that a heat exchange between these liquids will be very desirable and increase the efficiency of the system.

The liquid having passed through the coil 13, flows into the radiating tubes 13' provided with radiating fins 15, thereby entering the absorber 11 at the required temperature.

The gases, that will remain in their gaseous state in the absorber 11, will not easily pass in solution into the liquid used in the system. They are heated by the heat generated by the dissolution of the gas in the liquid and collected in the higher regions of the absorber 11, and they leave the absorber through the conduit 19 and are conveyed to the evaporator through the passage 20 which surrounds the tube 10. The cold refrigerating gas flowing into the tube 10 from the evaporator into the absorber, will cool the inoperative gases. These are further cooled by leaving them to expand in the chamber 21, which is in communication with the hollow cylinder 22 in turn communicating in its upper region with the interior of the evaporator.

Figure 6:
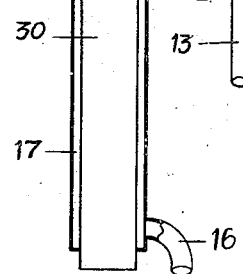
Fig. 6 shows a section, on an enlarged scale, of the boiler.

The boiler 1, illustrated in detail in Fig. 6, comprises a cylindrical body, within which is provided an inner tube 30 tightly connected with the cylindrical body and in which the source of heat is located. Said source of heat may be an electrical resistance or any other suitable source. The lower part of the tube 30 is surrounded by a tube 17 tightly sealed at its ends onto the tube 30 and having its lower portion in communication with the tube 16' and its upper portion with the tube 28, which runs along the whole length of the boiler and opens out in the upper part of the same, that is to say, above the level A—B normally reached by the liquid in the boiler. The liquid which has absorbed the refrigerating gas in the absorber, reaches the compartment between the tubes 30 and 17 and must not get mixed up with the liquid deprived of said gas and collected in the lower region of the boiler.

The liquid containing the gas in solution is greatly heated in the tube 17, thereby allowing said liquid to rise into the tube 28 and to enter the boiler from above, where it is again deprived of its refrigerating gas, which will leave the boiler 1 again through the conduit 2.

32 is one of the metallic pointed stems fixed onto the boiler and which should always remain in contact with the liquid for the purpose of regulating the ebullition in the boiler, which may otherwise become too turbulent.

In order to facilitate the absorption of the gas in the absorber, said absorption being favoured by a rather low temperature, the absorber 11 is provided with radiating fins 24. These fins may be fitted onto the container of the absorber in any suitable way, for instance by means of two sectors 34 fixed onto the container by bolts 35 shown in Fig. 2.

Naturally, in order to allow the various fluids to circulate as necessary, circulation pumps may be placed at suitable points in the circuit, as it is common use in these systems.

What I claim is:

1. In a refrigerating apparatus of the absorption type, a boiler for the separation of the refrigerating gas from the liquid and comprising a cylindrical body, an inner tube tightly connected to said body and in which the source of heat is located, a second tube surrounding the lower portion of said inner tube and tightly sealed onto the same, said second tube extending upwardly within said boiler between the cylindrical body and said inner tube, and a conduit extending upwardly from said second tube, along the whole length of the boiler and opening out in the upper part of the same.

2. In an evaporator an outer cylindrical casing, an inner tube, a plurality of vertically spaced annular discs mounted on said tube and extending radially between the tube and outer casing, said discs having a sector cut therefrom and the spaced ends deflected so that one is at a higher level than the other and the disc is of helical formation, adjacent discs being positioned with the lowermost end of one disc above and overlapping the uppermost end of the immediately lower disc, and the upper surface of said discs having drain guide recesses distributed thereover to insure even distribution of liquid flowing over said surfaces.

GIUSTO CATALANI.